July 7, 1959   J. R. HURLEY   2,893,243
MAGNETIC FLOWMETER
Filed Sept. 28, 1956

INVENTOR.
J. R. HURLEY
BY Hudson & Young
ATTORNEYS

////# United States Patent Office 2,893,243
Patented July 7, 1959

2,893,243

MAGNETIC FLOWMETER

James R. Hurley, Bartlesville, Okla., assignor to Phillips Petroleum Company, a corporation of Delaware Application September 28, 1956, Serial No. 612,694

2 Claims. (Cl. 73—194)

This invention relates to an improved magnetic flowmeter.

Magnetic flowmeters based upon Faraday's law of induction have been known for a number of years. According to this law, a conductor moving relative to a magnetic field has induced across it a voltage proportional to the velocity of movement as defined by the relationship:

$$E = Blv \times 10^{-8}$$

where E is the induced voltage in volts, B is the flux density in gauss, $l$ is the length of the conductor in centimeters, and $v$ is the velocity of the conductor in centimeters per second. The directions of $v$, $l$ and B are mutually perpendicular. A flowmeter based upon this principle comprises, in its simplest form, a conduit disposed in a magnetic field so that the direction of flow of a conductive fluid through the conduit is at right angles to the magnetic field. The conduit normally is constructed of a non-conductive material. The motion of the liquid through the conduit causes a voltage to be induced in the liquid which is proportional to its velocity. A pair of electrodes are embedded in the walls of the conduit so as to make electrical contact with the flowing liquid. The voltage induced in the liquid is thus transferred to these electrodes. The voltage between the electrodes is measured to provide a signal representative of the flow rate.

The magnetic field established across the conduit can be either alternating or direct. If a direct magnetic field is employed, the output signal is a direct current signal; and the output signal is an alternating signal if an alternating magnetic field is provided. Alternating magnetic fields are generally employed because it is much easier to measure small amplitude alternating voltages than small amplitude direct voltages. The use of an alternating magnetic field also eliminates the effect of polarization of the electrodes. Commercially available magnetic flowmeters commonly employ a voltage comparison system of detection. The voltage induced between the electrodes in the conduit is compared with a reference voltage which is proportional to the voltage which establishes the magnetic field. This system eliminates errors due to fluctuations in amplitude of the supply voltage.

However, a serious difficulty still remains when these flowmeters are energized by portable electrical generators, as is required in many field operations. This difficulty results from the fact that most portable generators do not provide output voltages of absolutely constant frequency. In fact, the frequency of a portable 60 cycle generator often varies as much as two or three cycles per second. The strength of a magnetic field established by an electromagnet which is energized from an alternating current source is an inverse function of the frequency of the current source. This is evident because the impedance of the energizing coil increases with an increase in frequency so that less current flows through the coil to establish the magnetic field.

In accordance with the present invention, an improved magnetic flowmeter is provided which is insensitive to changes in frequency of the power supply. The induced voltage which is representative of the fluid flow is compared with a reference voltage that is obtained from circuit means that are energized from the same power supply that energizes the electromagnet. These circuit means include an inductor which is of such configuration that the ratio of reactance to resistance in the circuit means is substantially equal to the ratio of the reactance to the resistance in the coil of the electromagnet. In this manner, the reference voltage changes with a change in frequency in the same manner as does the magnetic field so that no error is introduced if the frequency of the power source changes.

Accordingly, it is an object of this invention to provide an improved alternating current magnetic flowmeter which is insensitive to fluctuations in frequency of the power supply.

Another object is to provide an improved magnetic flowmeter which is particularly adapted for use with portable electrical generators.

Other objects, advantages and features of this invention should become apparent from the following detailed description which is taken in conjunction with the accompanying drawing in which.

Figure 1:
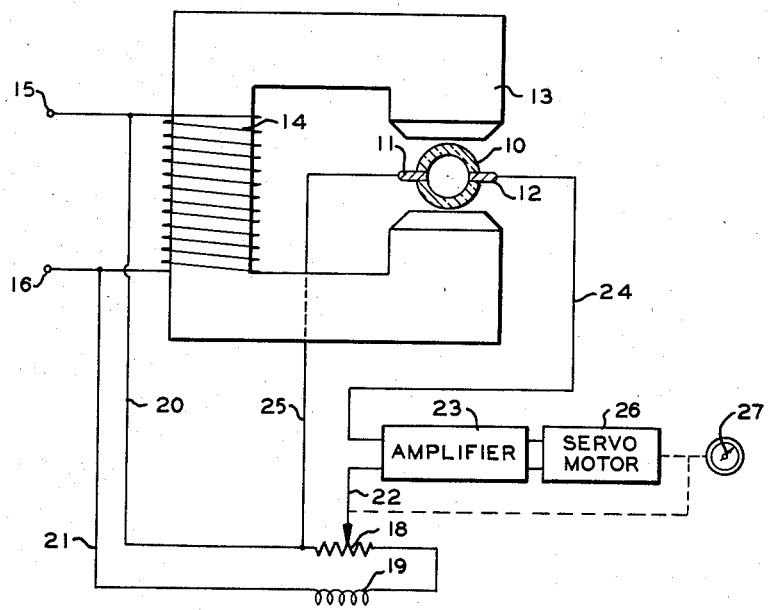
Figure 1 is a schematic representation of a first embodiment of the flowmeter of this invention.

Referring now to the drawing in detail and to Figure 1 in particular, there is shown a conduit 10 which is adapted to convey the fluid to be measured. The fluid to be measured must be electrically conductive, at least to a limited extent. Conduit 10 is formed of an insulating material, such as glass, which is not corroded by most fluids. First and second electrodes 11 and 12 are embedded in the walls of conduit 10 in facing spaced relationship with one another. Electrodes 11 and 12 are adapted to make electrical contact with the fluid in conduit 10. Conduit 10 is positioned between the pole pieces of an electromagnet 13 which is energized by a coil 14. The end terminals of coil 14 are connected to respective input terminals 15 and 16 which are adapted to be connected to a source of alternating current, not shown.

The first end terminal of a potentiometer 18 is connected to the first terminal of an inductor 19. The second end terminal of potentiometer 18 is connected by a conductor 20 to terminal 15. The second terminal of inductor 19 is connected by a conductor 21 to terminal 16. The contactor of potentiometer 18 is connected by a conductor 22 to the first input terminal of an amplifier 23. The second input terminal of amplifier 23 is connected by a conductor 24 to electrode 12. Electrode 11 is connected by a conductor 25 to the second input terminal of potentiometer 18. The output terminals of amplifier 23 are connected to the input terminals of a servo motor 26. The drive shaft of motor 26 is mechanically connected to the contactor of potentiometer 18 and to an indicating dial 27.

Electromagnet 13 establishes an alternating magnetic field which extends across conduit 10 in a direction perpendicular to the direction of flow through the conduit. A voltage is thus introduced between electrodes 11 and 12 which is proportional in amplitude to the velocity of fluid flow. A reference voltage is established across potentiometer 18 which is a function of the input voltage between terminals 15 and 16. The portion of this reference voltage between the second end terminal of potentiometer 18 and the contactor thereof is compared with the induced voltage between electrodes 11 and 12 by means of amplifier 23. The output signal of amplifier 23 energizes servo motor 26 to move the contactor of potentiometer 18 until the two voltages being compared are equal. For example, if the induced voltage between electrodes 11 and 12 should increase due to an increase in fluid flow, motor 26 moves the contactor of potentiometer 18 toward the first end terminal thereof until the increased voltage between the second end terminal and the contactor of potentiometer 18 is equal to the increased induced voltage. This movement is indicated by dial 27 which is calibrated in terms of fluid flow. Obviously, potentiometer 18 can be calibrated to eliminate the need for dial 27. Furthermore, the output signal of motor 26 can energize a suitable telemetering circuit if it is desired to indicate the measured flow at a remote location or if it is desired to control an operation in response to the measured flow.

As previously mentioned, a change in frequency in the power supply results in a change in the magnetic field across conduit 10. If the frequency of the power supply should increase, for example, the magnetic field is reduced due to the increased impedance of coil 14 and the resulting decrease in current flow therethrough. This decrease in magnetic field results in a corresponding decrease in the voltage induced between electrodes 11 and 12. However, the reference voltage circuit of this invention is designed to compensate for this deviation. An increase in frequency also increases the impedance of coil 19 so that less current flows through potentiometer 18 and the corresponding potential drop there across is decreased. This decreases the reference voltage so that no change exists in the measured potential difference. This compensation is accomplished by constructing the circuit elements so that the ratio of the reactance to the resistance of coil 14 is equal to the ratio of the total reactance of the total resistance of the series connected circuit elements 18 and 19.

Figure 2:
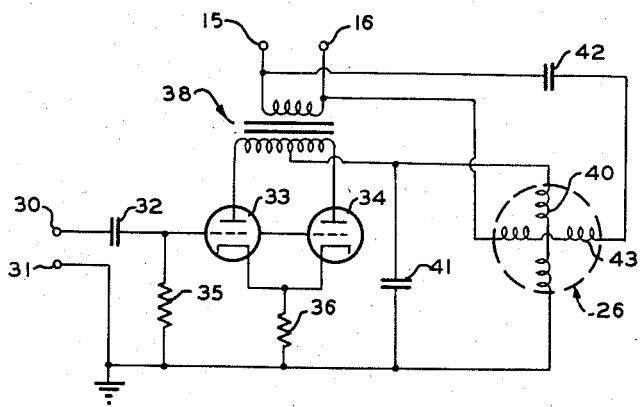
Figure 2 is a schematic circuit drawing of an amplifier and servo motor which can be employed in the flowmeter of Figure 1.

A suitable amplifier and servo motor for use in the flowmeter of Figure 1 is illustrated schematically in Figure 2. Terminals 30 and 31 represent the respective input terminals of amplifier 23. In some applications, it is desired that additional amplifier stages be incorporated in the circuit of Figure 2 preceeding terminals 30 and 31. Terminal 30 is connected through a capacitor 32 to the control grids of triodes 33 and 34. Terminal 31 is connected to ground. The control grids of triodes 33 and 34 are connected to ground through a common resistor 35. The cathodes of triodes 33 and 34 are connected to ground through a common resistor 36. The anodes of triodes 33 and 34 are connected to the respective end terminals of the secondary winding of a transformer 38. The primary winding of transformer 38 is connected between terminals 15 and 16. The center tap of the secondary winding of transformer 38 is connected to ground through the first coil 40 of a two-phase inductor motor 26. A capacitor 41 is connected in parallel relationship with coil 40. Terminal 15 is connected through a capacitor 42 and the second coil 43 of motor 26 to terminal 16.

The apparatus of Figure 2 comprises a conventional servo system which is familiar to those skilled in the art. Triodes 33 and 34 are capable of conducting alternately during the half cycles that the voltages applied to the respective anodes from transformer 38 are positive. The amounts of conduction are proportional to the input signal which appears between terminals 30 and 31. The phase of the output signal which is applied across motor coil 40 is representative of the polarity of the input signal between terminals 30 and 31. The direction of rotation of motor 26 is representative of the polarity of this signal.

The drive shaft of motor 26 is connected to the contactor of potentiometer 18 in a manner so that the contactor is moved in a direction to tend to equalize the voltages appearing at input terminals 30 and 31.

Figure 3:
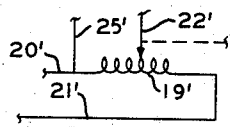
Figure 3 is a schematic view of a portion of a second embodiment of the flowmeter of this invention.

In Figure 3, there is shown a modified form of the flow measuring apparatus of Figure 1. The flowmeter of Figure 3 is identical to that of Figure 1 except that an inductor 19' replaces the series connected inductor and potentiometer of Figure 1. The reference voltage applied to amplifier 23 is obtained between one end terminal and a variable contact on inductor 19'. This variable contact is adjusted by servo motor 26 in the manner previously described. In the embodiment of Figure 3, inductor 19' is selected so that the ratio of the reactance to the resistance of this element is equal to the ratio of the reactance to the resistance of coil 14.

In view of the foregoing description, it should be evident that a magnetic flowmeter is provided in accordance with this invention which is insensitive to fluctuations in frequency of the power supply. This flowmeter can thus be employed to advantage in field operations where a constant frequency power supply is not available. Furthermore, the flowmeter is of simplified construction and requires a minimum number of circuit components.

While the invention has been described in conjunction with the present preferred embodiments, it should be evident that it is not limited thereto.

What is claimed is:

1. Flow measuring apparatus comprising a conduit adapted to pass the material to be measured, means including a coil to establish a magnetic field across said conduit, means to apply an alternating potential across said coil, a pair of spaced electrodes associated with said conduit to make electrical contact with fluid therein, an inductor and a potentiometer connected in series relationship with one another across said coil, the ratio of the reactance to the resistance of said inductor and said potentiometer being substantially equal to the ratio of the reactance to the resistance of said coil, voltage comparing means, means connecting one of said electrodes to one input terminal of said comparing means, means connecting the contactor of said potentiometer to the second input terminal of said comparing means, means connecting the second of said electrodes to one end terminal of said potentiometer, and means responsive to the output of said comparing means to adjust the contactor of said potentiometer until the potentials at the two input terminals of said comparing means are equal, the amount of adjustment being representative of changes in flow through said conduit means.

2. The combination in accordance with claim 1 wherein said means to establish a magnetic field comprises an electromagnet with facing spaced pole pieces, said conduit being positioned between said pole pieces, and wherein said electrodes extend through said conduit to the interior thereof in facing spaced relationship, a line connecting said electrodes being at right angles to the direction of the magnetic field between said pole pieces.

References Cited in the file of this patent
UNITED STATES PATENTS
2,757,538     Soffel _____ Aug. 7, 1956

OTHER REFERENCES

Article: "Measurement of Sea Water Velocities by E.M. Induction" by Guelke et al. in Journal of Institution of Electrical Engineers (British), vol. 94, parts 2 and 3, 1947, pages 71–74.